Aug. 28, 1934.   L. W. LESSLER   1,971,569

SAFETY SHUTTER FOR PROJECTORS

Filed Jan. 21, 1932

INVENTOR.
Lew W. Lessler.
BY Philip S. Hopkins
ATTORNEY.

Patented Aug. 28, 1934

1,971,569

UNITED STATES PATENT OFFICE 1,971,569

SAFETY SHUTTER FOR PROJECTORS

Lew W. Lessler, Johnson City, N. Y., assignor to Agfa Ansco Corporation, Binghamton, N. Y., a corporation of New York Application January 21, 1932, Serial No. 587,904

3 Claims. (Cl. 88—19.4)

My invention pertains to a safety shutter for projectors and has for its primary object the provision of a safety or fire shutter for motion picture projectors which is operable when the speed of the projector falls below a predetermined point, to interpose itself between the light source and the film and thus protect such film against ignition by the intensity of heat from the light source.
One important object of my invention lies in the provision of such a safety shutter which is operable during either the forward or reverse movement of the projector mechanism.

Other objects and advantages in details of construction will be apparent as the description proceeds, reference now being had to the figures of the accompanying drawing forming a part of this invention and wherein like reference numerals indicate like parts.
In the drawing.

Figure 1:
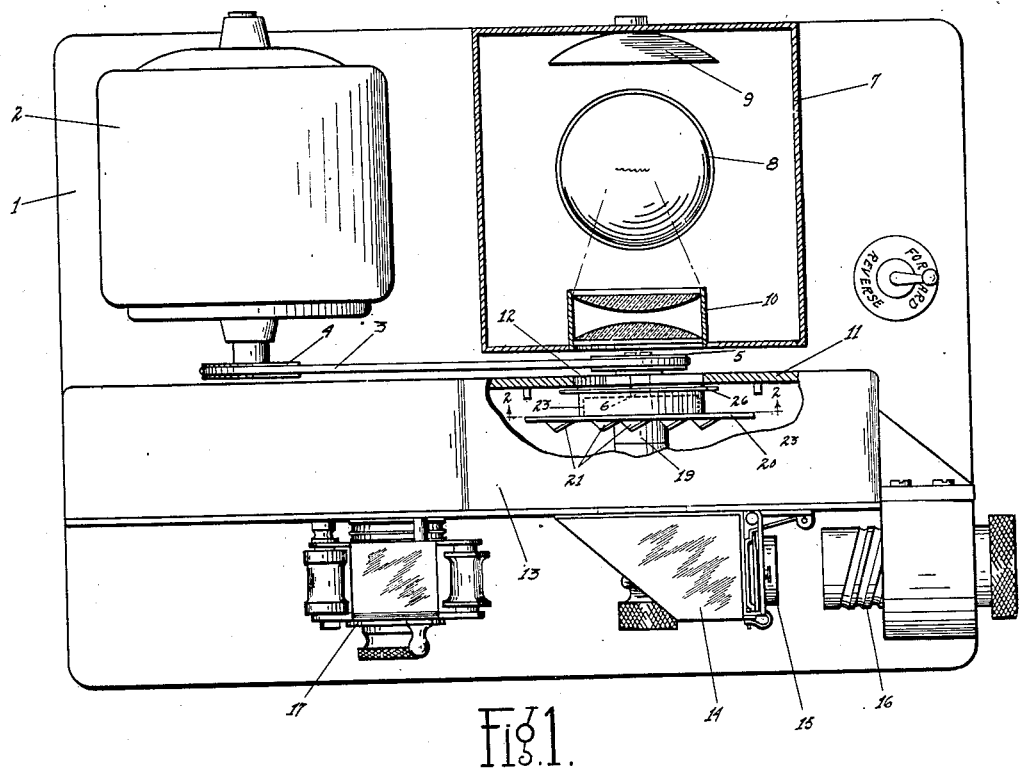
Figure 1 is a top plan view of a projector embodying my invention, certain parts being shown in section for clearness of illustration.

I am aware, of course, that safety shutters for motion picture projectors have been patented and in common use for many years but so far as I know, all such safety shutters have been operable to move out of light intercepting position upon the projector mechanism attaining a predetermined speed, in one direction of movement of the projector mechanism only.

With the advent of the small or 16 m.m. motion picture projectors, they have been made to run both forward and reverse and consequently the safety shutters thereon are operable only during the forward movement of the projector mechanism. By my invention I have provided a novel means for causing the safety shutter to function normally regardless of whether the projector is run forward or in reverse.

The reference character 1 designates generally a supporting base upon which is mounted a motor 2 which, by means of the belt 3 encircling the pulley 4 on the motor shaft and a pulley 5 on the shaft 6, serves to rotate such shaft 6 in either direction.

A lamp housing 7 is provided on the base 1 and within this housing are positioned the lamp 8, reflector 9, and condenser lens assembly 10.
A partition 11 is provided on the base 1 spaced slightly from the lamp housing 7 and this partition is provided with an opening 12, in alignment with the lamp and condenser lens assembly. This opening 12 is disposed above the shaft 6 which is journaled in the partition 11, as shown clearly in Figure 3.

The partition 11 forms part of a supporting housing 13 upon which is mounted a reflector 14 in alignment with the lamp and condenser assembly 10. Thus the light passing therethrough is reflected at right angles by the reflector 14 through the film gate 15 through which passes a film to be projected, and through the lens mount 16 by means of which the images on the film are projected to a suitable screen. The film feeding sprocket mechanism is indicated generally at 17 and is mounted upon the casing 13. This mechanism forms no part of this invention and has, therefore, not been illustrated in detail. The same is true of the film gate and the driving means for the film sprocket.

Secured to the shaft 6, as by the set screw 18 is a hub member 19 rotatable with the shaft 6. Rigidly secured to this hub 19 in any suitable manner is the projector shutter 20. This shutter is of such diameter as to overlie the opening 12 and is provided with a series of fan blades 21 preferably struck out of the shutter material and serving the double purpose of dissipating the heat from the lamp 1 and as an anti-flicker device for the light passing therethrough.

Rotatably journaled in the partition 11 and also freely rotatable with respect to the shaft 6 passing therethrough is a sleeve 22 provided with a cylindrical cup member 23 opening toward the shutter 20 and terminating just short thereof. The flanged portion of this cup 23 overlies the adjacent end of the hub member 19.

Figures 2, 3:
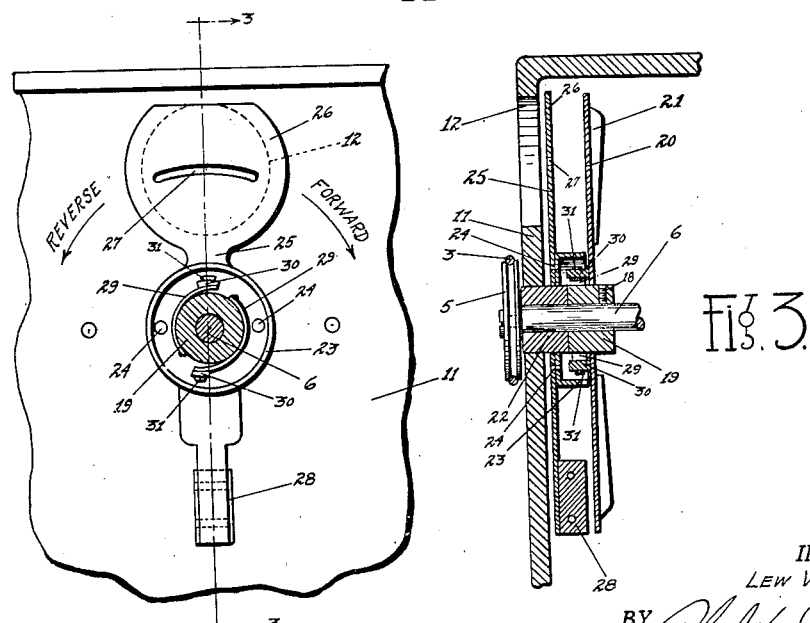
Figure 2 is a detail view of the safety shutter taken on the line 2—2 of Figure 1.
Figure 3 is a detail sectional view taken on the line 3—3 of Figure 2 and with the projector shutter added.

This cup 23 has secured thereto, as by means of the pins 24, a safety shutter 25 provided at one end with an enlarged disk portion 26 having a slot 27 therein, such enlarged portion 26 being adapted to normally register with the opening 12 in the partition 11. The opposite end of the shutter 26 is provided with a weight 28 which serves to normally rotate the sleeve 22 and consequently the shutter 25 to bring such shutter into vertical position as shown in Figures 2 and 3.

The hub 19 is provided on its periphery with oppositely disposed leaf springs 29, the free ends of which are provided with weights 30 having soft pads or shoes 31 thereon adapted for frictional engagement with the cup 23, when the shaft 6 is rotated at a speed sufficient to cause one of the weights 30 to fly outwardly into engagement with the said cup. It will be noted that these friction clutch devices are so disposed on the hub 19 in opposite directions, that regardless of the direction of rotation of the shaft 6, one of them will move outwardly by centrifugal force into light frictional engagement with the cup 23.

This frictional engagement is sufficient to rock the cup and consequently the safety shutter 25 about the shaft 6 to uncover the opening 12 so long as a predetermined speed of the shaft is maintained. If, however, the projector is stopped or that required speed is not maintained, the clutch member will, of course, disengage the cup and the weight 28 on the shutter 25 and cause the shutter to resume its vertical position with the enlarged disk portion 26 thereof in alignment with the opening 12. The slot 27 in the disk portion 26 in the shutter permits a certain amount of light to pass through to the film so that partial illumination can be had even though the projector is stopped. It serves, however, to protect the film against the intensity of the heat from the lamp 8 when the film is not moving or is moving at a very slow speed.

Obviously, regardless of whether the projector is running in forward or reverse directions, the safety shutter 25 is equally operable for the purpose intended.

Of course, changes may be made in details of construction and arrangement of parts without departing from the spirit and scope of my invention. I do not limit myself, therfore, to the exact form herein shown and described other than by the appended claims.

I claim:

1. In combination with a reversible motion picture projector having a light passage, a driven shaft, means for rotating said shaft in either direction, a safety shutter journaled on said shaft and normally in said light passage, and means on said shaft for moving said shutter out of said passage upon rotation of said shaft at a predetermined speed in either direction.

2. In combination with a reversible motion picture projector having a light passage, a driven shaft, means for rotating said shaft in either direction, a safety shutter journaled on said shaft and normally in said light passage, and means on said shaft for moving said shutter out of said passage upon rotation of said shaft at a predetermined speed in either direction, said means comprising a centrifugal clutch cooperating with said shutter.

3. In combination with a reversible motion picture projector having a light passage, a driven shaft, means for rotating said shaft in either direction, a sleeve rotatably journaled around said shaft, a safety shutter secured to said sleeve and normally in said light passage, a cup member on said sleeve, a hub fixed on said shaft for rotation therewith, centrifugally operable clutch members on said hub adapted to cooperate with said cup whereby said safety shutter is moved out of said passage upon said shaft attaining a predetermined speed, said clutch members being so disposed as to operate upon rotation of said shaft in either direction.

LEW W. LESSLER.